United States Patent [19]

Carr et al.

[11] Patent Number: 4,621,562
[45] Date of Patent: Nov. 11, 1986

[54] REMOTE CONTROL ROBOT VEHICLE

[75] Inventors: Michael J. R. Carr; Colin Sennett, both of Newcastle; Brian Wilkinson, North Shields, all of England; Russell E. Winn, deceased, late of Cork, Ireland, by Geraldine Betty Winn, legal representative

[73] Assignee: Monitor Engineers Limited, Wallsend, England

[21] Appl. No.: 499,257

[22] Filed: May 31, 1983

[51] Int. Cl.[4] .................................................. F41C 7/00
[52] U.S. Cl. ........................................ 89/41.05; 86/50; 180/6.48; 180/22; 280/111; 414/729
[58] Field of Search ............. 294/86 R; 414/729, 735, 414/739; 901/21, 36, 37, 38, 1; 180/6.5, 22, 65.5, 6.48; 280/104, 111; 89/41 TV, 40 B, 36 M, 39, 41 R, 37 R; 86/1 B

[56] References Cited

U.S. PATENT DOCUMENTS

| | | |
|---|---|---|
| 3,043,448 | 7/1962 | Melton .............................. 901/15 X |
| 3,241,687 | 3/1966 | Orloff ................................ 901/15 X |
| 3,273,912 | 9/1966 | Crockett ............................. 280/104 |
| 3,504,122 | 3/1970 | Ratliff, Jr. ........................ 89/41 TV |
| 3,809,004 | 5/1974 | Leonheart .......................... 180/22 X |
| 4,192,216 | 3/1980 | Wait .................................... 89/40 B |
| 4,199,210 | 4/1980 | Trott ............................. 294/86.26 X |
| 4,256,013 | 3/1981 | Quitadama ...................... 89/41 TV |
| 4,267,562 | 5/1981 | Raimondi .................... 89/41 TV X |
| 4,396,344 | 8/1983 | Sugimoto et al. .................. 414/735 |

Primary Examiner—L. J. Paperner
Assistant Examiner—Donald W. Underwood
Attorney, Agent, or Firm—Saidman, Sterne, Kessler & Goldstein

[57] ABSTRACT

A remote control robot vehicle which includes at least two pairs of wheels, at least one pair of which is driven, said pairs of wheels being mounted on a support secured to the vehicle which supports are each mounted for pivotal movement about a generally horizontal axis extending longitudinally of the vehicle, those wheels on the same side of the vehicle being capable of being driven synchronously.

18 Claims, 8 Drawing Figures

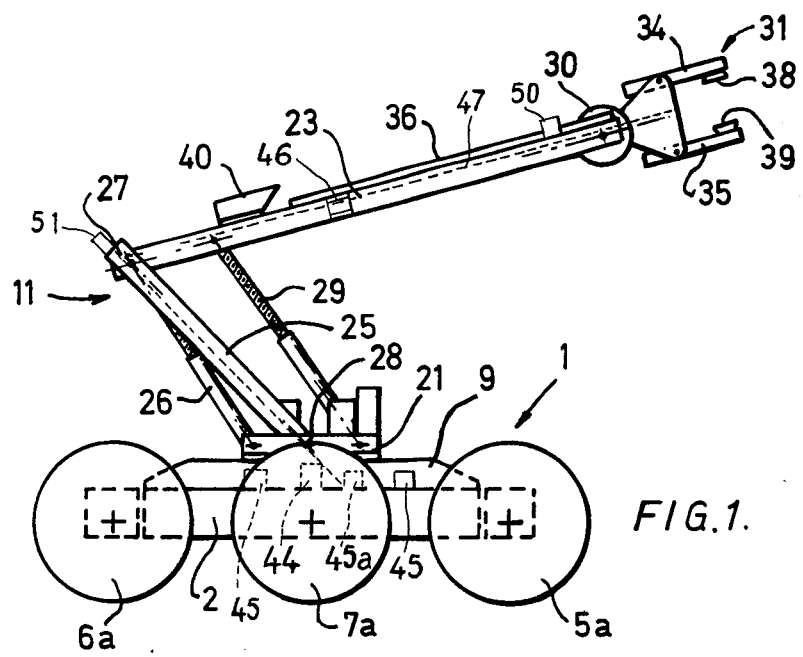
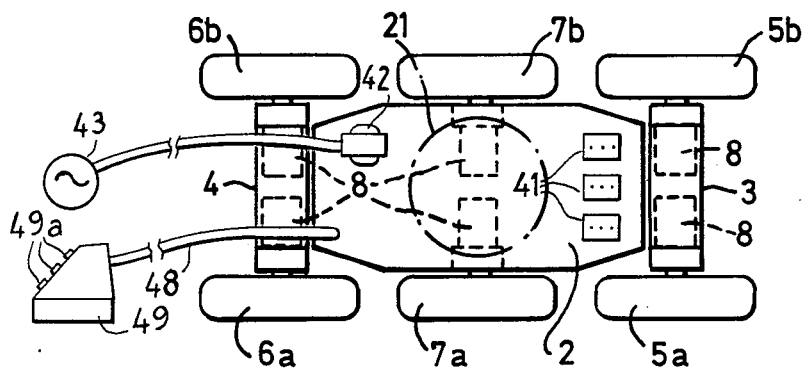
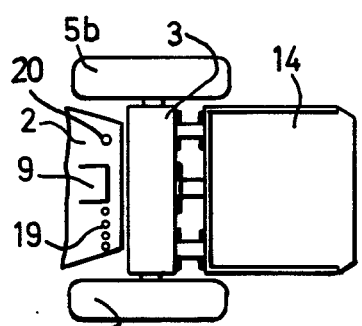
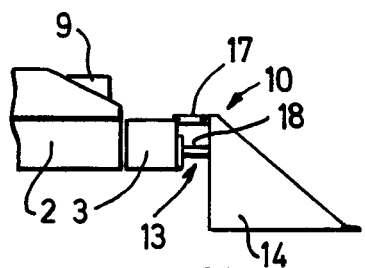
FIG.1.
FIG.2.
FIG.3a.
FIG.3b.

REMOTE CONTROL ROBOT VEHICLE

This invention relates to a remote-control robot vehicle which may be adapted to function as a bomb-disposal or bomb-inspection robot or may be adapted for the handling of radioactive or chemical materials, for fire-fighting, for security activities, for remote surveillance or for defence operations.

Remote control robot vehicles have been employed for bomb-inspection and bomb-disposal purposes. Known vehicles are track-laying. A major problem with the known vehicles is that they are prone to shed a track when traversing rough ground, long grass and kerbs, the result being that only one side of the vehicle is powered so that it will travel only in circles. Additionally the known vehicles have only primitive facilities.

According to a first aspect of the present invention there is provided a remote-control robot vehicle which includes at least two pairs of wheels, at least one pair of which is driven, said pairs of said wheels being each mounted on a support secured to the vehicle which supports are each mounted for pivotal movement about a generally horizontal axis extending longitudinally of the vehicle, those wheels on the same side of the vehicle being capable of being driven synchronously.

Generally the pivot axis for the two pairs is common; likewise the axes of rotation of a said pair of wheels is generally common.

Preferably two extra driven wheels are provided one on each side of the vehicle intermediate of the said pairs of wheels, so that, preferably, six driving wheels are provided.

Very preferably the vehicle is electrically powered e.g. from storage batteries, from an onboard electricity generator or by cable from a remote power source. Each wheel is preferably arranged to be driven by its own separate electric motor and associated gearbox. Braking means may be provided on one or more of the wheels, which means may be e.g. disc, drum, electromagnetic or indeed dynamic braking, operative when the current is not being supplied, may be employed.

The vehicle may carry a wide variety of remotely controllable devices, together with the apparatus necessary to effect said control. The control is preferably carried out by sending suitable electric signals down a control cable to operate relays, solenoids, etc. as necessary; if it is preferred, however, radio control or other physically separate control methods may be employed.

An embodiment of a vehicle according to the present invention will now be described by way of example only, by reference to the accompanying drawings in which:

FIG. 1 is a diagrammatic side elevation of a robot-control bomb vehicle according to the present invention;

FIG. 2 is a plan view of a chassis of the vehicle partly cut away, having six wheels mounted thereon;

FIGS. 3a and 3b are plan and side views of a lifting attachment of the vehicle on a front end thereof;

Figure 4A:
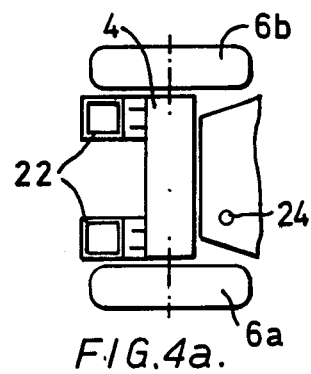
FIGS. 4a and 4b are plan and side views of a rear of the vehicle.
Figure 4B:
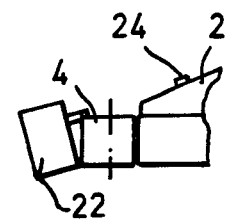
Figure 5B:
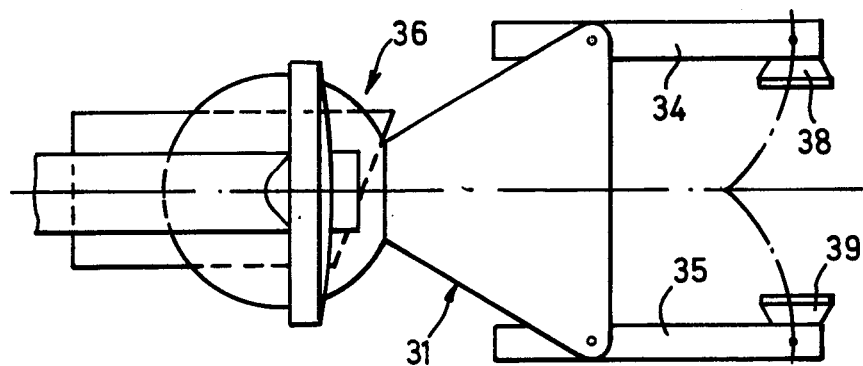
FIGS. 5a and 5b are plan and side views of an end of a robot arm of the vehicle showing various apparatus mounted thereupon.
Figure 5A:
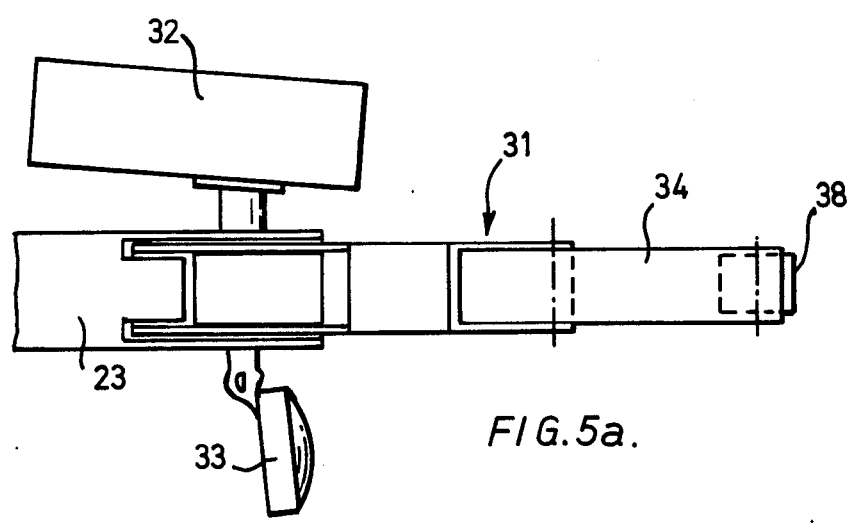

Referring to the drawings, a vehicle 1 includes a chassis 2 and, mounted for pivotal movement about a longitudinally extending axis, front and rear sub-frames 3 and 4, respectively.

Each sub-frame 3, 4 is provided with first and second pairs of driving wheels, 5a, 5b and 6a,6b arranged one on each side of the sub-frame. Mounted upon the chassis 2 between drive wheels 5a, 6a, and 5b, 6b, respectively, is a third pair of driving wheels 7a,7b, one on each side thereof. Each driving wheel is provided with its own D.C. electric motor and gearbox 8.

Also supported by the chassis 2 is a pair of batteries 41, an electric power transformer 42, a camera 9 mounted between the two front wheels 5a, 5b and adapted to scan the forward path of the vehicle, a lifting apparatus 10 and a rotatable turret assembly 11, with additional drive motors for purposes to be explained hereinafter, and structures and power outputs 19 for holding/receiving other accessories such as a spot lamp 33 or such as one or more disruptors.

The batteries 41 are 12-volt heavy-duty lead-acid accumulators, the transformer 42 is adapted to step down a main voltage supply from a remote source 43 for recharging the accumulators and for providing power for the various motors directly from the transformer, as desired.

The camera 9 is a closed-circuit television camera located between ad approximately at the level of the front wheels 5a, 5b so that an accurate impression may be obtained and transmitted to the terrain across which the vehicle 1 is to travel.

The lifting apparatus 10 comprises lifting arms 13, on to which can be mounted a scoop or tray 14.

The lifting arms each comprise a parallel linkage arrangement in which a top link 17 is of fixed length and a bottom link 18, is in the form of a jackscrew which can be extended and retracted to raise and lower the scoop 14.

Also provided adjacent to the front of the chassis 2, are two pairs of electrical power outputs 19 and a separate output 20 for supplying electricity to a spot lamp (not shown) which can be affixed to the front of the chassis.

The rotatable turret 11, is mounted on a base or turntable 21 which is rotatable on the chassis 2 about a vertical axis by means of a toothed gear arranged to be driven by a further electric motor 44 and gear-box. The turret is arranged to be rotatable through approximately 720°.

Means 22 are provided at the rear of the chassis for carrying items of equipment which may be utilized by the robot arm 23,25 of the bomb-disposal vehicle. A preferred example of such an item of equipment is an electrically actuable 'disrupter' adapted to fire a charge of water. A pair of such disrupters may be carried. Additionally or alternatively an electricity generator may be carried to render the vehicle self-contained.

Also provided at the rear end of the chassis are sockets 24 for receiving control and power cables.

The turret 11 bears a plurality of electric motors and gearboxes and a jointed manipulable arm device 23, 25. The arm comprises a first portion 25 pivoted on the turret at a lower end 28 and movable in a vertical plane by means of a jack screw 26 driven by a first motor and gearbox 45 of the turret which jackscrew 26 is connected between the turret and an upper end 27 of the said first portion 25. Pivoted at the upper end 27 of the first arm portion 25 is a second arm portion 23 also movable in a vertical plane by means of a second jack screw 29 driven by a second motor and gearbox 45 of the turret. Preferably the two said jackscrews can be operated at the same rate so that by simultaneous operation of both jackscrews the said second portion can be moved while maintaining a particular orientation, e.g. horizontal.

Mounted at the distal end 30 of the said second arm portion 23 is a claws device 31 arranged for rotation and for pivotal movement, whereby extensive freedom of movement is provided. The drives for said rotation and pivot movements are by way of separate chain drives 47 driven by separate motors and gearboxes 45a mounted on said turret. The rotation of said claws 31 can be continuous in either direction to permit the claws to effect, for example, a screwing or unscrewing motion. Also mounted at the distal end 30 of the said second arm portion, for pivotal movement with the claw 31 are a closed-circuit television camera 32 and a spot lamp 33 whereby the operating area of the claws 31 may be kept under scrutiny.

The claws consist of two claw fingers 34,35 openable and closable by means of an electric motor 50 located on said second arm portion 23, power being provided across the point of rotation 51 by means of slip rings. The claw fingers 34,35 are provided with electrical contacts 38, 39 of an electrical circuit whereby an electrical device held by the claws 31, e.g. a disruptor, may be actuated. The claw fingers 34,35 are shaped so that positive location and alignment of the electrical contacts with the said electrical device is achieved.

Also mounted on said second arm portion 23 is a semi-automatic repeater shotgun 36, and solenoid/relay means 46 for pulling the trigger of the shotgun and a closed-circuit television camera 40 for sighting the shotgun.

Control for the vehicle of the present invention is comprehensive. A 25-way control cable 48 which in this embodiment may be up to 225 m long extends from the vehicle to a control console 44. The cable is preferably wound on a slip reel so that it will pay out automatically as the vehicle moves away from the control console.

The control console 49 comprises a television screen, means for selecting between respective cameras, a pair of control wheels for supplying power to respective banks of driving wheels thereby to steer and drive the vehicle 1, two control buttons for independently moving the first and second arm portions 23,25 a joystick for controlling pivotal and rotational movement of the claws 31, separate buttons on the joystick for left and right turret 11 rotation a switch on the joystick for claw 31 opening and closing. Also provided on the control console are buttons for actuating the frame lifting mechanism 10 on the chassis, for selecting the output of another camera which may be mounted on the vehicle 1 or fixedly located off the vehicle 1, for supplying electricity to the electrical contacts of the claws 34,35 and for supplying electricity to the additional outputs 19,20 provided on the chassis. An additional button may be provided for controlling a zoom lens provided on any one of the cameras aforementioned. The various control buttons are indicated generally at 49a.

An interlock system is provided whereby the shotgun trigger actuator button only operates when the shotgun sighting camera has been selected.

To enable the television cameras to operate at a considerable distance from the power source and the control console a "twisted pair" arrangement is employed.

Operation of the vehicle and its various functions is controlled within the vehicle by four control boxes, the first and second of which act upon control signals from the console to actuate respective banks of driving wheels, the third of which acts upon control signals to select and power the television cameras and the fourth of which selects and powers the various other functions of the vehicle.

Preferably the vehicle its components are modular in construction, disassembly and assembly being as far as possible a matter of simple unplugging or plugging-in and/or the removal/insertion of securing pins.

The vehicle of the present invention provides a sophisticated remote-control robot which is particularly suited for bomb observation and disposal work but which is adaptable for a wide variety of purposes, such as those enumerated hereinbefore.

I claim:

1. An unmanned remote control robot vehicle which includes a chassis, two pairs of driving wheels, each said pair of wheels being mounted on a support secured to the chassis of the vehicle which supports are each mounted for pivotal movement about a generally horizontal axis entending longitudinally of the vehicle and a third pair of driving wheels mounted on the chassis is intermediate of said two pairs of driving wheels, means being provided for driving those wheels on the same side of the vehicle synchronously with each other.

2. A vehicle according to claim 1, wherein the functions of the vehicle are electrically powered, from a source selected from a group consisting of a remote source and from on-board electric batteries.

3. A vehicle according to claim 1, which further includes a turntable, a robot arm mounted upon the turntable and gripping means at an end of the robot arm, together with means for independently rotating the turntable, for activating the arm and for operating the gripping means, and which is provided with a plurality of closed-circuit television cameras, one mounted for sighting along said robot arm, one mounted adjacent the gripping means and one mounted at a front area of the vehicle between said pair of driving wheels.

4. The vehicle according to claim 1, which further includes a turntable; a robot arm mounted upon the turntable, gripping means at an end of the robot arm; a shotgun provided on the robot arm; together with means for independently rotating the turntable, for activating the arm, for operating the gripping means, and means provided on said arm for firing a shotgun.

5. A vehicle according to claim 4, wherein the gripping means includes jaws provided with electrical contacts for making an electrical circuit with a device gripped by said jaws.

6. A vehicle according to claim 4, wherein a pair of screwjacks is connected at one end respectively to an end of a first section of the robot arm and an intermediate position of a second section of the robot arm and at the other end respectively to means for rotating the screwjacks thereby to form an articulation mechanism for articulating the robot arm.

7. A vehicle according to claim 4, wherein said gripping means is controllable under the influence of chain drive means from motor means located on the turntable.

8. A vehicle according to claim 4, further comprising a control console for providing operating signals and a cable for controlling movement of the turntable, arm and gripping means from a distance.

9. An unmanned remote control robot vehicle comprising:
- a chassis having first and second ends;
- a first subframe pivotally mounted about the longitudinal axis of said first end of said chassis;
- a second subframe pivotally mounted about the longitudinal axis of said second end of said chassis;
- a first pair of driving wheels rotatably disposed at the distal ends of said first subframe;
- a second pair of driving wheels rotatably disposed at the distal ends of said second subframe;
- a third pair of driving wheels rotatably disposed on each side of said chassis between said first and second pairs of driving wheels;
- a plurality of drive motor means mounted on said chassis wherein each of said drive motor means is coupled to a corresponding individual driving wheel;
- transmission means for transmitting rotational energy between each of said drive motor means and its associated driving wheel;
- a lifting apparatus pivotally connected to said front subframe;
- a turret assembly rotatably connected to said chassis;
- means for rotating said turret assembly;
- a first arm, having first and second ends, wherein said first end of said first arm is pivotally connected to said turret assembly;
- a second arm, having first and second ends, wherein said first end of said second arm is pivotally connected to said second end of said first arm;
- a first jackscrew means pivotally disposed between said turret assembly and said first arm;
- means for rotating said first jackscrew;
- a second jackscrew means pivotally disposed between said turret assembly and said second arm;
- means for rotating said second jackscrew;
- a claw, comprising first and second claw fingers, disposed at the distal end of said second arm;
- motor means for operating said claw device;
- a pair of electrical contacts disposed on the distal ends of each of said claw fingers for energizing devices placed in electrical contact therewith;
- shotgun means disposed on said second arm wherein said shotgun is remotely activated, wherein the longitudinal axis of the barrel of said shotgun means is parallel to the longitudinal axis of said second arm and wherein the muzzle of said shotgun means is pointed in the direction of the distal end of said second arm;
- a closed circuit TV camera disposed on said second arm wherein the image of said camera is aligned with the sight of said shotgun means;
- a remote control console further comprising means for individually controlling each of said electrically operated devices; and
- wire means electrically connecting said console to said electrically operated devices.

10. An unmanned remote control robot vehicle as recited in claim 9 wherein said lifting apparatus further comprises
- a scoop pivotally connected to said first subframe by fixed top link means and jackscrew bottom link means wherein said scoop is pivoted by the rotation of said jackscrew means.

11. An unmanned remote control robot vehicle as recited in claim 9 wherein said means for rotating said turret assembly further comprises an electric motor.

12. An unmanned remote control robot vehicle as recited in claim 9 further comprising a second closed circuit TV camera disposed between said first pair of driving wheels on said first subframe.

13. An unmanned remote control robot vehicle as recited in claim 9 further comprising a plurality of rechargeable batteries and charging means therefor.

14. An unmanned remote control robot vehicle as recited in claim 9, further comprising means for connecting said on board vehicle mounted electrically operated devices to a remote source of electrical power.

15. An unmanned remote control robot vehicle as recited in claim 9, further comprising a closed circuit TV camera disposed on the distal end of said second arm portion wherein said camera provides an image of the operation of said claw device.

16. An unmanned remote control robot vehicle as recited in claim 9 wherein said means for operating said claw device further comprises a chain drive mechanism.

17. An unmanned remote control robot vehicle as recited in claim 9, further comprising electrical interlock means permitting said shotgun means to operate only when the shotgun sighting camera has been selected.

18. An unmanned remote control robot vehicle as recited in claim 9 further comprising a third closed circuit TV camera focussed upon said claw device.

* * * * *